Feb. 7, 1933.  H. B. KENDALL  1,896,795
GASKET
Filed April 23, 1931
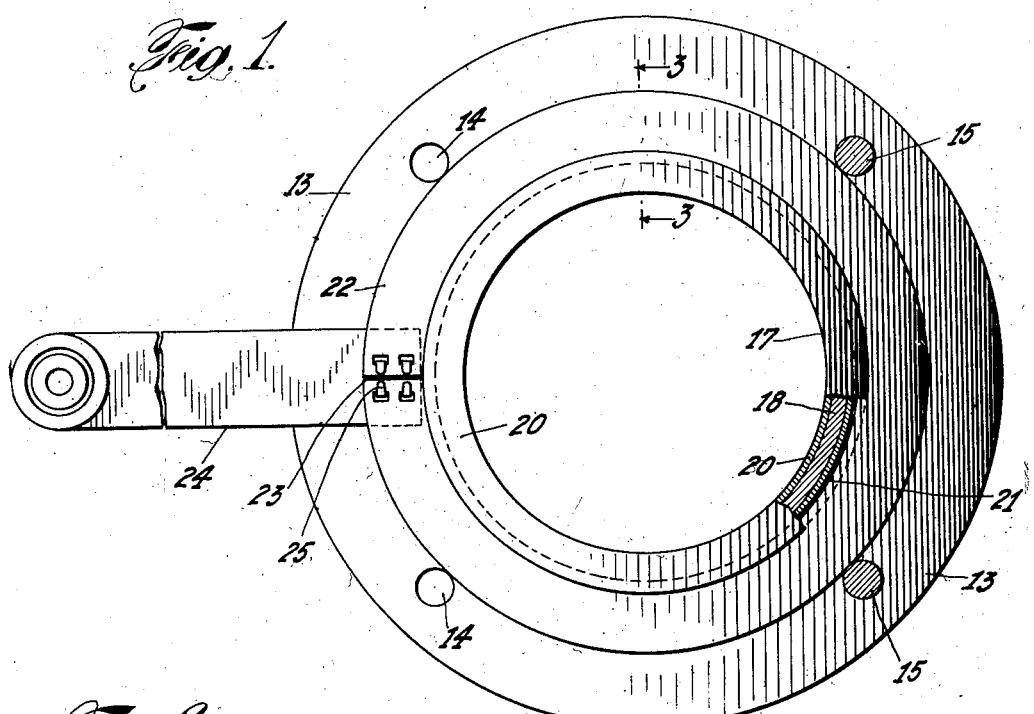
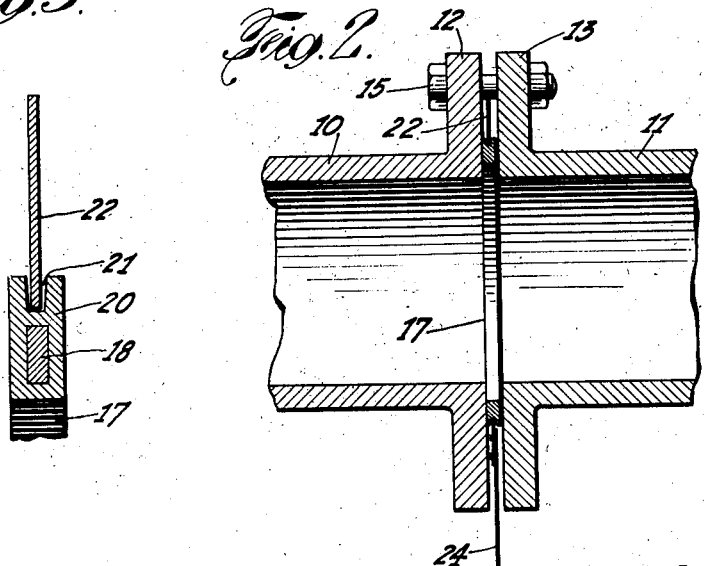
Inventor
HARRY B. KENDALL
By his Attorneys
Hogart + Heary Patented Feb. 7, 1933

1,896,795

UNITED STATES PATENT OFFICE

HARRY B. KENDALL, OF ROSELLE, NEW JERSEY, ASSIGNOR TO THE M. W. KELLOGG COMPANY, OF NEW YORK, N. Y., A CORPORATION OF DELAWARE

GASKET

Application filed April 23, 1931. Serial No. 532,171.

My invention relates to gaskets such as are customarily employed as fluid-tight packings between pipe flanges for connecting adjacent sections of a conduit or conduit sections and fittings.

The use of gaskets as packings to form a fluid-tight joint between pipe flanges is, of course, old. The flanges of standard pipes have a series of spaced apertures arranged circumferentially of the flange for receiving bolts or other fastening means for tightly connecting adjacent pipe sections. It is difficult to assemble gaskets with such pipe flanges so that the gaskets are accurately fitted and centered relatively to the axis of the sections because the exterior dimension of the gasket is necessarily less than that of the flanges in order to allow room for the bolts.

One feature of my invention is a gasket which is easily assembled between adjacent sections of a conduit to seal the conduit at the joint.

A second feature resides in providing a gasket with a gauge or centering device for facilitating the accurate positioning of the gasket relatively to the axis of a conduit.

My gasket is of ring form and is adapted to be mounted between the flanges of adjacent pipe sections in contact with the faces of the flanges. The gasket is provided with a peripheral groove in which a gauge in the form of a metallic annulus is mounted. In connecting adjacent pipe sections and packing the joint several, but not all, of the fastening bolts are arranged to loosely connect the pipe sections. The annulus has a handle connected thereto so that the gasket may readily be inserted between the pipe flanges and accurately centered relatively to the axes of the pipe sections by abutment of the annulus against the securing bolts which have been inserted in their apertures to loosely connect the pipe sections. Since these bolts are concentric with the bore of the pipe and are engaged by the annulus on the gasket, the annulus serves as a gauge for insuring accurate positioning of the gasket. The remaining bolts may be then inserted and all bolts tightened to securely hold the gasket between the pipe sections for sealing the point and to secure the pipe sections to each other.

In the drawing:

Figure 1 is a plan view of a gasket according to my invention, the gasket being shown in assembled relation to the flange on one end of a pipe.

Figure 2 is a sectional view of the joint between adjacent pipes of a conduit, the gasket being shown inserted between the flanges of adjacent pipes.

Figure 3 is a sectional view on the line 3—3 of Figure 1 illustrating the construction of the gasket.

Referring to the drawing, the numerals 10 and 11 designate adjacent sections of tubular piping forming a conduit. The pipes 10 and 11 are provided at their ends with flanges 12 and 13 having a series of apertures 14 arranged circumferentially of the flange and concentric with the bore of the pipe for receiving bolts 15 to connect the pipes to each other.

In accordance with my invention the joint is sealed by a flat metallic gasket 17 which is shown as annular in form but which may be of such other configuration as is deemed desirable or necessitated by the section of the pipes.

The gasket 17 may be of copper or other suitable metal which has a coefficient of expansion greater than that of the pipes and which is slightly compressible when inserted between the pipe sections and tightly bound between the flanges of the pipes so that a tight seal is maintained. The gasket illustrated has a core 18 of sheet steel or other metal which will resist deformation of the gasket under high pressure or temperature conditions, the core being encased within a copper shell 20. However, it is to be understood that if desired the gasket may be a solid annulus of copper or other suitable metal.

The gasket 17 has a peripheral groove 21 for receiving an annulus 22 which, in effect, constitutes a flange on the gasket extending its diameter to correspond to the diameter of a circle tangential to the inner arcs of the apertures 14 in the pipe flange.

The annulus 22 is split at 23 and is of suitable metal, such as sheet steel, having sufficient resilience to permit the ends of the annulus being sprung apart so that it may be mounted in the peripheral groove 21 of the gasket 17. The annulus 22 is preferably of a metal of sufficient hardness to resist bending or distortion, in order to insure proper functioning of the annulus as a gauge.

A handle 24 is connected to the annulus 22 to facilitate mounting of the gasket 17 at the pipe joint. As shown, the handle 24 has a plurality of lugs 25 inserted through openings adjacent the ends of the annulus 22 and clinched for fastening the handle to the annulus and also for connecting the ends of the annulus adjacent the split to prevent detachment of the annulus from gasket 17. The handle 24 may be of softer metal than the annulus 22 so that after the gasket has been mounted between the pipe sections the portion of the handle projecting from the joint may be broken or cut off.

The combined thickness of annulus 22 and handle 24 is less than that of the gasket 17, so that both will lie well within the planes of the side surfaces of the gasket in order to prevent interference with the sealing functions of the gasket or the compression thereof between the ends of the pipe sections.

In assembling the gasket 17 with pipe sections to form a packing therebetween, the sections 10 and 11 are positioned with their ends in adjacent alignment, but sufficiently spaced to receive the gasket, as shown in Figure 2 of the drawing. Two or more of the bolts 15, but fewer than the whole number used in connecting the pipes are inserted through aligned apertures 14 in the flanges 12 and 13 so as to bridge the space between the pipe ends. The gasket 17 is then grasped by handle 24 and projected into the space between the pipe ends until the annulus 22 abuts the bolts. Inasmuch as the apertures 14 and the bolts 15 therein are arranged concentrically with the bore of the pipe, it follows that the gasket 17 is accurately positioned when the periphery of the annulus 22 is placed in abutment with two or more of the bolts 15. Thus, the annulus 22 served as a gauge to insure proper and accurate positioning of the gasket.

The remainder of the full complement of bolts are then inserted while the gasket is held in position by means of the handle 24 connected to the annulus, all the bolts when inserted abutting the periphery of the annulus 22 to hold the gasket 17 in position. All the bolts are then tightened so as to cause the pipe flanges to grip the gasket between them and compress it sufficiently to form a tight leak-proof joint. In the form of joint illustrated, the gasket is tightly held between the faces of the pipe flanges.

The handle 24 and annulus 22 being thinner than the gasket do not interfere with the sealing function of the gasket. The portion of the handle 24 which projects from the joint may then be bent aside out of the way or cut or broken off, as desired.

Although I have described the annulus 22 as a split ring the ends of which are sprung apart to mount the annulus on the gasket, it is to be understood that various other constructions and methods of assembly may be employed. Further, although the gauge member which I employ has been described as an annulus, it is to be understood that the gauge member may be of other form, such as an arcuate member of suitable size and shape. The handle may be utilized to maintain the annulus or other gauge member on the gasket and to assemble the gasket with the pipe sections, and also may be connected to the annulus, or other gauge member, in any other suitable manner than that shown.

While my invention has been described in its preferred form there are many changes and variations which may be made without departing from the spirit thereof, and I desire to include all such changes and variations within the scope of the appended claims.

I claim:—

1. A gasket having a peripheral groove; a split annular member resting in said groove and extending beyond the periphery of the gasket; and a radially extending handle connecting with said annular member so as to join with the annular member on both sides of the split.

2. A gasket having an annular flange connected therewith, said flange being radially split and apertured adjacent the ends formed by the split, a handle of soft metal having fingers struck therefrom and projecting through the apertures on both sides of the split.

3. A gasket having a peripheral groove, an annular gauge member having a thickness less than the thickness of said gasket lying between the planes of the sides of said gasket and extending beyond the periphery of the gasket, said annular gauge member being split at one portion whereby it may be removed from the groove of said gasket, and a handle of relatively soft material fastened to said annular gauge member and projecting beyond the apparatus within which said gasket may operate, said handle being adapted to be easily altered from its projecting position on said annular member.

4. A positioning device adapted to cooperate with a gasket having an outer peripheral groove comprising an annular split member of relatively stiff resilient material adapted to be sprung into position within the peripheral groove of said gasket and adapted to be removed therefrom, said annular member having a thickness less than the thickness of said gasket and lying within the planes of the sides of said gasket, and a handle connected with said annular member, said handle having a thickness less than the thickness of said gasket and projecting beyond the apparatus within which said gasket may operate, said handle being adapted to be easily altered from said projecting position.

5. A positioning device adapted to cooperate with the gasket having an outer peripheral groove comprising a split annular member of resilient sheet metal operable to be sprung into said groove and to be removed therefrom, said annular member extending beyond the periphery of said gasket and of a thickness less than the thickness of said gasket and lying between the planes of the sides of said gasket, and a handle of relatively flexible sheet metal connected to said annular member and projecting beyond the apparatus within which said gasket may operate, said handle having a thickness less than the thickness of said gasket and being adapted to be easily altered from the projecting position on said annular member.

In testimony whereof, I have signed my name to this specification this 20th day of April, 1931.

HARRY B. KENDALL.